United States Patent [19]
Rhee

[11] Patent Number: 5,674,389
[45] Date of Patent: Oct. 7, 1997

[54] REMOVAL OF TETRACHLOROETHYLENE IMPURITY FROM WATER

[76] Inventor: Choong H. Rhee, P.O. Box 1041, Huntington Beach, Calif. 92647

[21] Appl. No.: 593,273

[22] Filed: Jan. 29, 1996

[51] Int. Cl.⁶ .................................................. B01D 24/22
[52] U.S. Cl. ...................... 210/232; 210/252; 210/283
[58] Field of Search .......................... 210/283, 290, 210/265, 232, 241, 284, 241.4, 252

[56] References Cited

U.S. PATENT DOCUMENTS

| | | | |
|---|---|---|---|
| 524,827 | 8/1894 | Jones et al. | 210/265 |
| 1,135,753 | 4/1915 | Baldwin | 210/262 |
| 3,252,899 | 5/1966 | Rice et al. | 210/290 |
| 4,049,548 | 9/1977 | Dickerson | 210/96.1 |
| 4,054,515 | 10/1977 | Sawyer, Jr. | 210/27 |
| 4,196,081 | 4/1980 | Pavia | 210/284 |
| 4,374,028 | 2/1983 | Medina | 210/669 |
| 4,383,920 | 5/1983 | Muller et al. | 210/241 |
| 4,473,477 | 9/1984 | Beall | 210/691 |
| 4,659,460 | 4/1987 | Muller et al. | 210/241 |
| 4,774,004 | 9/1988 | Gruenewaelder | 210/663 |
| 4,830,755 | 5/1989 | Hardin | 210/265 |
| 4,944,875 | 7/1990 | Gaignet | 210/232 |
| 5,120,435 | 6/1992 | Fink | 210/290 |
| 5,296,137 | 3/1994 | Gershon et al. | 210/282 |
| 5,427,683 | 6/1995 | Gershon et al. | 210/264 |

Primary Examiner—Cynthia L. Nessler
Attorney, Agent, or Firm—Erik M. Arnhem

[57] ABSTRACT

A system for removing tetrachloroethylene impurity from water includes two or more adsorption columns in series flow relation. Each column has a upper layer of clay granules and a lower layer of activated charcoal granules. The liquid moves in a downflow direction through each adsorption column.

1 Claim, 1 Drawing Sheet

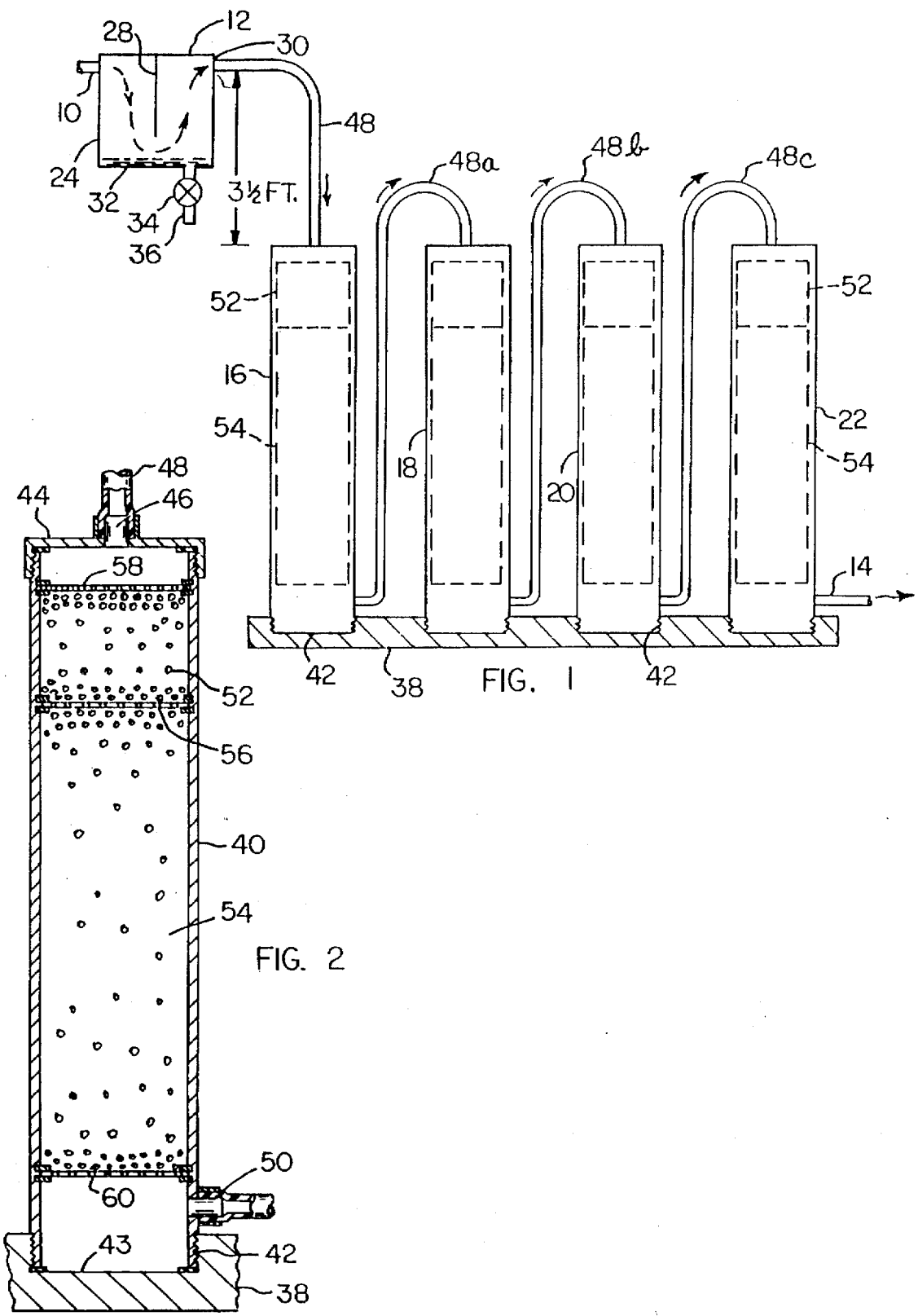

REMOVAL OF TETRACHLOROETHYLENE IMPURITY FROM WATER

BACKGROUND AND SUMMARY OF THE INVENTION

This invention relates to an impurity removal system designed especially to remove the tetrachloroethylene (also called perchloroethylene) impurity from waste water.

It is known that in most dry cleaning establishments using water cooled condensers for the purpose of condensation of varporized moisture, the condensed water can accumulate tetrachloroethylene an impurity to a maximum level of approximately 200 milligrams impurity per liter of water.

It is a practice in some establishments to discharge the impure water to the sewer at a rate varying from about one to two gallons impure water per day. Some jurisdictions have established an upper limit on the quantity or concentration of tetrachloroethylene, or other volatile organic solvent, that can legally be discharged into the sewer. The permissible limit, typically, is five milligram volatile organic solvent per gallon of water.

The legal limitations on organic solvent concentration have inevitably led to treatment systems for treating the impure waste water so that water discharged to the sewer has less than the legally prescribed concentration of the volatile organic solvent, principably tetrachloroethylene. The present invention is concerned with such a treatment system.

In one particular system embodying the invention, water containing a minor percentage of tetrachloroethylene impurity in a concentration of about 200 milligrams or less impurity per one liter of water, is passed sequentially through a first inertial separator stage for removing some of the impurity by inertial separator action, and a second adsorption stage for removing the remaining impurity by selective adsorption of the impurity out of the pretreated water. The impurity adsorption stage removes substantially all of the impurity not removed by the inertial separator stage. This particular system is in addition to the existing separator box attached to the dry cleaning machine.

The adsorption stage comprises a plurality of upstanding adsorption columns, miniaturized in accordance with the relatively small daily volume of water that is handled by the system (e.g. two gallons per day). Each adsorption column comprises an upstanding tubular housing that supports a vertical adsorption bed containing clay granular material and activated charcoal in granular form, whereby passages are formed through the intergranular spaces for downflow of liquid through the adsorption bed.

The principal component in the system is the adsorption column containing granular clay and charcoal, since the adsorption columns act as the final purifier to remove the last quantities of impurity, that are the most difficult to remove.

Theoretically the system can operate without the inertial separator that removes the easiest-to-remove impurity. However, without the inertial separator, the tetrachloroethylene impurity tends to prematurely saturate the adsorption beds, thus reducing the effective life of the system before regeneration or column replacement. Therefore, the preferred treatment system includes an inertial separator as the first stage for removing the least difficult-to-remove impurity from the water being treated.

The use of adsorption columns for removing impurities from various liquids is already known. For example, the adsorbent fuller's earth has been used for bleaching, clarifying or declorizing mineral oils, vegetable oils and animal oils. The adsorbent bauxite has been used in the percolation treatment of petroleum fractions. Alumina has been used as an adsorbent for the dehydration (water removal) of air, various other gases, and various liquids. Magnesia has been used as an adsorbent for the purification treatment of gasoline, and the regeneration of dry cleaning solvents. Activitated charcoal has been used as an adsorbent for decolorizing kerosene, for adsorbing various acids, and for purifying various gases (by adsorbing micron size impurities that affect color or aroma).

The present invention provides two separate adsorbents, clay and activated charcoal in granular form, to achieve an improved separation of tetrachloroethylene from water. The preferred clay is bentonite containing the mineral montmorillonite; this naturally occurring clay is a relatively soft absorbent, chemically inert clay formed from the alteration of volcanic ash, and containing significant percentages of silica and aluminum oxide.

Bentonite clay is a polar adsorbent wherein dipoledipole interactions between the absorbent surface and the adsorbed particles (adsorbate) produce the desired particle transfer to the adsorbent surface. Activitated charcoal is a non-polar adsorbent that utilizes dispersion forces to achieve particle transfer. It is believed that a superior overall impurity removal action is achieved by using a polar adsorbent (bentonite clay) in combination with a non-polar adsorbent (activated charcoal).

Further features and advantages of the invention will be apparent from the attached drawings and description of a preferred embodiment of the invention.

THE DRAWINGS

FIG. 1 is a view, partly schematic, showing a treatment system embodying the invention.

FIG. 2 is an enlarged sectional view taken through an adsorption column used in the FIG. 1 system.

DESCRIPTION OF A PREFERRED EMBODIMENT OF THE INVENTION

Referring to FIG. 1, there is shown a treatment system for removing tetrachloroethylene impurity from water, whereby water discharged from the system is substantially free of the impurity. In the illustrated system, impure water, at a designated pressure, is supplied to the system through a liquid inlet pipe 10 associated with an inertial separator 12. Purified water, containing essentially no tetrachloroethylene, is discharged from the system through an outlet tube 14 extending from an upstanding adsorption column 22. The illustrated system comprises four similarly-constructed columns 16, 18, 20 and 22 in series flow relation with the inertial separator 12.

Water flow through the system takes place sequentially through inertial separator 12, then through adsorption column 16, then through adsorption column 18, then through adsorption column 20, and finally through adsorption column 22. Flow through each adsorption column is in the downward direction, through a granular absorption bed supported within the column tubular housing. Each adsorption column has the same construction depicted in FIG. 2.

Inertial separator 12 comprises an upright rectangular, box-like, housing 24 having a vertical partition 28 separating the housing into a downflow chamber and upflow chamber. Water, containing a minor quantity of tetrachloroethylene, flows downwardly from inlet 10 along one face of partition 28, then upwardly along the other face of partition 28 to outlet 30.

Tetrachloroethylene is insoluble in water; additionally tetrachloroethlene is heavier than water. The density (specific gravity) of tetrachloroethylene is about 1.625. Accordingly, it is possible to achieve a partial separation of tetrachloroethylene from water by inertial separator action. In the FIG. 1 system some of the tetrachloroethylene separates from the water as the liquid mixture reverses direction, while passing rightwardly across the plane of partition 28. The separated tetrachloroethylene liquid collects as a liquid layer 32 in the lower end of housing 24.

Periodically the collected tetrachloroethylene can be removed from housing 24 by opening a manual valve 34 located in a drain line 36 leading from the lower end of the separator. The valve is left open carefully to ensure that a significant portion of the collected tetrachloroethylene is removed, without at the same time removing any of the water. The removed tetrachloroethylene is sufficiently concentrated that it can be reused as a dry-cleaning solvent.

The water discharged through outlet 30 has a reduced concentration of tetrachloroethylene, but not low enough that the liquid mixture can be discharged to the sewer. Typically the liquid mixture at the outlet 30 will be water having a tetrachloroethylene impurity concentration up to about 200 milligrams per liter of the mixture. Adsorption columns 16, 18, 20 and 22 serve to remove the final traces of tetrachloroethylene from the water.

As shown in FIG. 1, the four adsorption columns 16, 18, 20 and 22 are supported on a common base plate (or mounting plate) 38, such that each column has the same elevation. Liquid flowing downwardly through each column has essentially the same linear velocity, without any surges or velocity changes. The four adsorption columns are all located approximately 3½ feet or more below the elevational plane of the inertial separator so that a satisfactory liquid head for gravity flow is established at the upper end of each adsorption column. However, the liquid head for gravity flow is adjusted to be relatively low (by controlling the supply pressure at inlet 30), whereby the liquid requires approximately one hour to complete its downward travel through each respective adsorption column. The low flow rate through each adsorption column contributes to a relatively complete adsorption of the tetrachloroethylene (preferably the first column 16).

In preferred practice of the invention, essentially all of the tetrachloroethylene in the mixture discharged from separator 12 is adsorbed by the adsorption bed in column 16. The other three columns 18, 20 and 22 act as back-up collection devices for any tetrachloroethylene that might inadvertently escape the collecting action of column 16.

FIG. 2 depicts one construction that each adsorption column can take. As shown in FIG. 2, the adsorption column comprises an upright tubular housing 40 having an externally threaded lower end, whereby the housing can be screwed into an internally threaded socket 42 formed in the upper surface of mounting plate 38. Socket surface 43 thereby forms the lower end wall of the column or each adsorption column can have an additional bottom wall.

The upper end of tubular housing 40 is externally threaded to receive a screw-on cap 44 that forms the upper end wall of the adsorption column. A liquid inlet fitting (pipe) 46 is welded or otherwise secured to cap 44 to provide an attachment surface for one end of a flexible plastic tube 48. As shown in FIG. 1, the other end of tube 48 is connected to the outlet 30 on separator 12, whereby liquid flows downwardly through tube 48 into the upper end of the tubular housing.

With respect to the last three adsorption columns 18, 20 and 22, liquid flows from each preceding column through a flexible tube 48a, 48b, and 48c, in order to reach the upper end of the respective column. Liquid flows from an outlet at the lower end of each adsorbent column through a flexible tube (48a, 48b, and 48c) to reach the upper end of the next column. In FIG. 2, the liquid outlet for a representative outlet is designated by numeral 50.

The adsorption bed in each column comprises an upper layer of granular clay material designated by numeral 52, and a lower layer of granular activated charcoal designated by numeral 54. The granular clay material is preferably bentonite containing the mineral montmorillonite; such material has significant percentages of silica and aluminum oxide which are believed to provide reasonably good adsorption properties for tetrachloroethylene. The clay granules constitute a polar adsorbent. The activited charcoal granules in lower layer 54 acts as a non-polar adsorbent for the impurity in the down-flowing liquid.

The total vertical height of the adsorbent bed is comprised of the upper granular layer 52 and lower granular layer 54. Preferably granular layer 54 has a vertical thickness that is about four times the vertical thickness of granular layer 52. Accordingly, the gross volume occuppied by the clay is about twenty percent of the bed volume, whereas the gross volume of the activated charcoal is about eighty percent of the bed volume (assuming the same ratio between the granules and void spaces in each layer).

Preferably the granules, in each case, are spherical, or near-spherical, so that interconnecting passages are formed in the respective layers for facilitating the downflow of liquid through the adsorption bed.

The granular size can vary within limits without adversely affecting the adsorptive action. Typically, each granule can have a diameter in the range of 0.02 inch to 0.03 inch. Preferably all of the granules are approximately the same size, or mesh.

The granules can be supported in tubular housing 40 with various mechanisms. As shown in FIG. 2, the granular clay layer 52 is supported on a horizontal foraminous plate or screen 56 having its outer edge located between E rings seated in grooves in the housing side wall. Similar foraminous plates or screens 58 and 60 are provided for confining the upper surface of clay layer 52 and supporting the lower layer of activated charcoal 54.

As shown in FIG. 2, the clay granules are separated from the activated charcoal granules (i.e. the clay granules form the upper layer, whereas the charcoal granules form the lower layer). Conceivably the clay granules and charcoal granules could be intermixed to provide a homogeneous mixture from the top of the bed to the bottom of the bed. However, it is believed preferable to separate the two types of granules, in order to prevent possible fracture of granules (due to different fracture resistances) and to enable the respective granules to perform their respective functions without counteracting influences by the other type granules. The clay particles provide the primary collection force, whereas the activated charcoal Granules serve as the final collection force for particles not collected by the clay granules.

As indicated earlier, in preferred practice of the invention the first adsorption column 16 collects all, or substantially all, of the tetrachloroethylene impurity. The remaining columns 18, 20 and 22 act as back-up collectors.

A model system incorporating the invention was tested to verify the system operation. In the tested system the adsorption column height (layers 52 and 54) was about fifteen inch, and the column diameter was two and one half inch, such that the volume of each adsorption bed was about seventy three cubic inch; the system contained four adsorption columns in series flow relation.

When the system was operated it was supplied with water containing 150 milligram per liter concentration of tetrachloroethylene impurity, it was found that the first adsorption column removed all of the impurity, even after the system was cycled for a time period equivalent to an entire year of normal operation, i.e. two gallons per day for three hundred twelve days. At periodic times during the test the water issuing from each adsorption column outlet was tested for tetrachloroethylene content; no discernible trace of tetrachloroethylene was found at the outlets for columns 18, 20 and 22. The entire amount of tetrachloroethylene in the influent was collected by the first column 16. This research was performed with a fully automated and computerized Varian Gas Chromatography System, Model 3300.

The collection efficiencies of the adsorption column are such that any given column in the system can be used to its maximum capability. Thus, when column 16 is saturated to an unusable level, it can be replaced by the existing column 18 (since column 18 is still essentially in an unsaturated condition); the other columns 20 and 22 can be advanced to the positions occuppied by columns 18 and 20, respectively, end the column 16 with newly filled granules will be placed in the column 22 position (final position). Repositioning of the columns is facilitated by the screw-type mounting offered by the sockets 42.

The drawings show a preferred form that the inventor can take. However, it will be appreciated that the invention can be embodied in various forms and configurations. For example the system can be used without the inertial separator 12 (but at the expense of shorter column life), also the system can use a lesser number of adsorption columns, e.g. two columns or three columns.

In preferred practice of the invention, the various columns are constructed to have the same size and capacity. Each column is preferably designed with a sufficient safety factor, whereby the linear velocity of downflowing liquid is relatively low, e.g. a velocity wherein approximately one hour is required for a given liquid element to flow from the upper screen 56 to the lower screen 58. A low liquid velocity in the adsorption bed contributes to an increased adsorption efficiency.

What is claimed is:

1. A treatment system for removing tetrachloroethylene impurity from water, comprising a plurality of similarly dimensioned upstanding tetrachloroethylene adsorption columns connected in series so that liquid is passed sequentially through the columns; and a horizontal mounting plate defining means for supporting all of said upstanding columns at a single common level; each upstanding column comprising a tubular housing having an upper end, a liquid inlet in said upper end, an open threaded lower end, a liquid outlet proximate to said lower end, a bed-support means located above said liquid outlet, and an adsorption bed defining means for adsorbing tetrachloroethylene and extending between said bed-support means and said liquid inlet; each said adsorption bed comprising clay granular material and activated charcoal in granular form whereby passages are formed through the adsorption bed for downflow of liquid from the inlet to the outlet; said horizontal mounting plate having a plurality of similarly-sized threaded sockets mated to the threaded ends of said columns, each of said sockets forming an end surface for one of said columns, whereby the lower end of each column can be screwed into any one of said sockets; said tubular housings being interchangeable so that different housings can be moved from socket to socket, as necessary to replace the first column in the series with a different column.

* * * * *